F. ADEE & J. FOLEY.
CAST LEAD-TRAP.
No. 176,258.        Patented April 18, 1876.
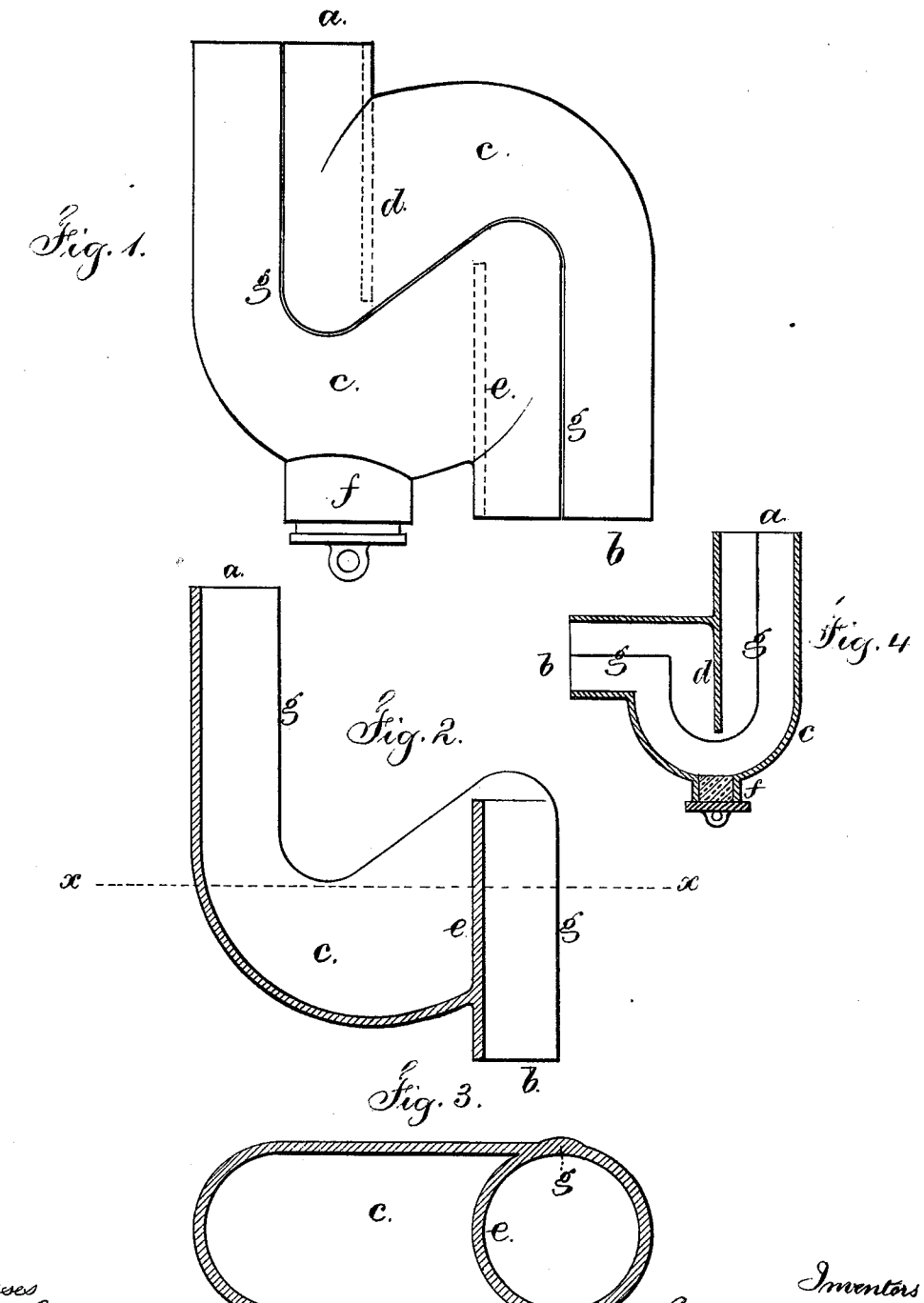

UNITED STATES PATENT OFFICE.

FREDERICK ADEE AND JAMES FOLEY, OF BROOKLYN, NEW YORK.

IMPROVEMENT IN CAST-LEAD TRAPS.

Specification forming part of Letters Patent No. 176,258, dated April 18, 1876; application filed February 24, 1876.

*To all whom it may concern:*

Be it known that we, FREDERICK ADEE and JAMES FOLEY, of Brooklyn, in the county of Kings and State of New York, have invented an Improvement in Cast Plumbers' Traps, of which the following is a specification:

In Letters Patent No. 162,331 a trap is shown of the same general character as the present, so far as its configuration, but the dam for the water-seal is made by the end of the pipe that is inserted the proper distance for this purpose.

Our present invention consists in a trap that is cast of lead or its alloys in two halves with a plate-forming the dam in the open half of the trap, and with the contiguous edges of the metal united by solder or by melting them together. Thereby the casting of the trap is greatly facilitated, and there is no occasion to employ a divided core.

In the drawing, Figure 1 is an elevation of the double or S trap complete. Fig. 2 is a vertical section of one of the halves of the trap. Fig. 3 is a sectional plan at the line $x$ $x$, and Fig. 4 shows the single or P trap. The inlet-pipe is attached to the trap at $a$, and the outlet at $b$. $c$ is the body of the trap, and $d$ and $e$ are the dams. The line at which the two parts of the S-trap are united is shown at $g\ g$.

It will be evident that the two halves of the trap are alike, except that a socket, $f$, for a trap-screw may be made on one of them.

By reference to Fig. 2 it will be seen that each half of the trap is made as an open or trough shaped half of a pipe curved to the body portion $c$, and that the dam is cast as a single plate, and in line with one side of the inlet or outlet pipes.

By this construction it will be apparent that only one mold will be required for making the entire S-trap, because both halves are alike, and the concave portion of the mold fits the outside of the trap, and the convex portion fits the inside of such trap, and contains the slightly-tapering mortise to form the dam. The molds will draw apart in the direction of the dam, so as to avoid the use of more than two parts to the mold; but we do not limit ourselves in this respect.

The two parts of the trap, when placed together, are united by melting the adjacent edges or by soldering. The edges should be left of increased thickness when they are to be melted together.

Where this improvement is applied to a P-trap, as seen in Fig. 4, the dam will be in the upper half, the lower half will not have any dam, and the second bend is dispensed with.

We claim as our invention—

1. A plumber's trap cast in two pieces with one of the dams cast in each piece, substantially as set forth.

2. The plumber's trap made of two corresponding pieces placed together and united, each half having in it a cast plate, forming the dam, as set forth.

3. A plumber's trap made with a plate dam cast in one of the open pieces thereof, substantially as specified.

Signed by us this 19th day of February, A. D. 1876.

FREDERICK ADEE.
     JAMES FOLEY.

Witnesses:
 GEO. T. PINCKNEY,
 CHAS. H. SMITH.